Nov. 27, 1962   J. MORKOSKI   3,065,804
ROTARY HOE WHEEL HAVING INTERCONNECTED TEETH
DEVELOPING A TRASH GUARD RING
Filed March 22, 1961

INVENTOR.
James Morkoski
BY Paul O. Pippel
Atty.

3,065,804
ROTARY HOE WHEEL HAVING INTERCONNECTED TEETH DEVELOPING A TRASH GUARD RING

James Morkoski, Clarendon Hills, Ill., assignor to International Harvester Company, Chicago, Ill., a corporation of New Jersey
Filed Mar. 22, 1961, Ser. No. 97,555
4 Claims. (Cl. 172—543)

This invention relates to agricultural implements and more particularly to an earth-working wheel of the rotary hoe type.

Rotary hoe wheels of various types are well known. In essence they comprise a series of sharp pointed teeth which project radially outwardly from a hub to which the inner ends or the root ends of the teeth are connected. It will be readily appreciated that as the teeth radiate outwardly of the hub the distance between the tip ends of the teeth is of maximum extent and progressively the distance between the teeth is less and, in effect, there is a wedge notch developed between adjacent teeth which, it has been found, is very susceptible to wedging trash which clogs the wheel and prevents its penetration into the ground. Various attempts have been provided to afford a trash guard to maintain the teeth clean.

The instant invention contemplates a novel convolution or conformation of the teeth such that they may be interconnected intermediate their ends and so arranged that they provide collectively a novel trash guard.

A further object of the invention is to provide a novel hoe wheel wherein the teeth are collectively arranged to provide a backing for each other to strengthen the tooth structure.

A further object of the invention is to provide a novel tooth arrangement wherein the teeth are preferably made of yielding material so that upon encountering conditions which normally would cause a wedging action, the constant yielding and relative movement between the teeth effects a kneading action upon the material between the teeth so that the trash is prevented from tightly wedging between the adjacent teeth.

A still further object of the invention is to provide a novel tooth arrangement such that each tooth has an intermediate portion which extends circumferentially away from the preceding tooth and then is curved outwardly to provide a wide space between the teeth and at the same time the intermediate portion provides a segment of the trash ring which is between the hub and the outer ends of the teeth.

A still further object of the invention is to provide a novel arrangement wherein the teeth are so formed and arranged that they provide sharp or narrow contact areas with each other such that they may be easily clamped together and resistance welded to form a unitary structure.

These and other objects and advantages inherent in and encompassed by the invention will become more readily apparent from the specification and the drawings wherein.

Figure 1:
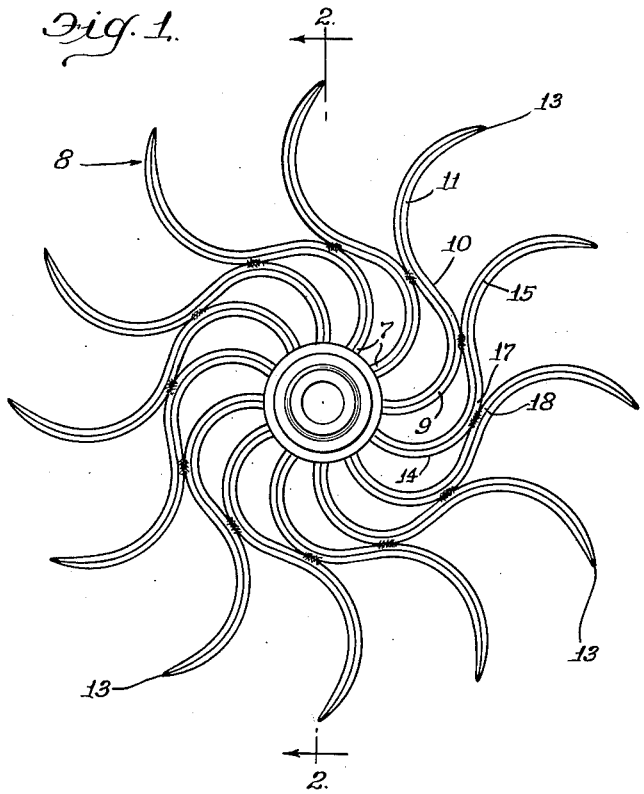
FIG. 1 is a side elevational view of the composite fabricated hoe wheel.
Figure 2:
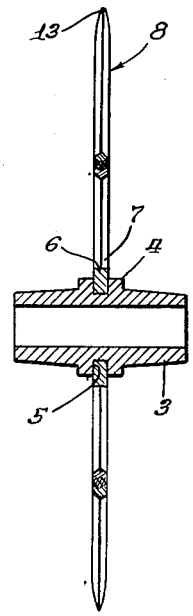
FIG. 2 is a radial sectional view taken substantially on the line 2—2 of FIG. 1.

Describing the invention in detail and having particular reference to the drawings, there is shown a cast metal tubular hub portion 3 which includes a thickened annulus 4 intermediate its ends, the annulus having a peripheral groove 5 within which is snugly received a cast steel ring 6 which may be cast into the hub portion 3 and for all intents and purposes is therefore considered integral therewith. The ring 6 provides a good welding material for connection to the inner ends 7 as by resistance or arc welding of the S-shaped teeth generally designated 8.

It will be seen that each tooth is substantially diamond-shaped in cross-section and is preferably of spring steel and from its root end portion 7 has a forwardly convexed concavo-convex inner portion 9 which merges into a generally diagonally outwardly and rearwardly extending intermediate portion 10, the portion 10 merging into the concavo-convex outer end portion 11 which has its concave side in the leading direction so that the outer sharp pointed tip 13 of the tooth has a leading attitude. It will be seen that the leading edge 14 of each tooth provides a forwardly directed apex which bears against the rearwardly directed apex 15 of the tooth thereahead, the contacting regions being located in the region of the merger of the inner portion of the tooth with the intermediate portion as indicated at 17 and the region or area 17 contacting the tooth thereahead in the region 18 which is between the inner end of the outer portion and the outer end of the intermediate portion. It will be realized that the intermediate portion of each tooth primarily extends circumferentially with respect to the wheel and it will be seen that each one of the teeth are resistance weld-connected in the regions 17, 18 and that the intermediate portions collectively define a trash guard ring and at the same time, because of the convolution of the teeth, provide a whorl center section which is yieldable to accommodate the wheel to different operating conditions and at the same time the teeth are movable circumferentially with respect to each other and therefore the entire structure becomes self-cleaning.

Figure 3:
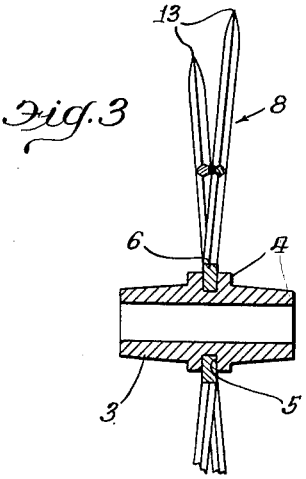
FIG. 3 is a sectional view illustrating a modified form of the invention.
Figure 4:
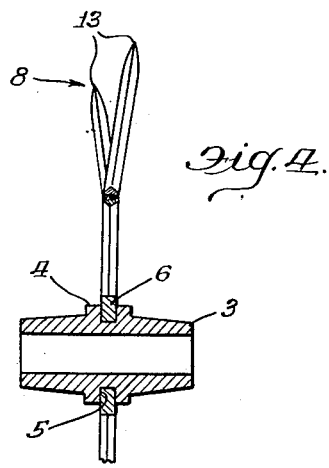
FIG. 4 is a further sectional view comparable to FIG. 2 showing a still further modification of the invention.

Referring now to the arrangement in FIG. 3, it will be realized that the wheel is constructed exactly as heretofore except that the sections comparable to 17 and 18 are disposed in side-by-side relationship and welded together along their lateral sides. This obtains a lateral divergence of the teeth as best seen in FIG. 3, and obtains wide coverage for the wheel in pulverizing the earth. In FIG. 4 parts identical with those of the previous embodiments are identified with corresponding reference numerals and the construction is identical with that of FIG. 1 except that the teeth are laterally angled beyond their juncture, whereas in FIG. 3 they are laterally angled with respect to each other from the root end portions.

What is claimed is:

1. An earth-working wheel comprising a hub, a plurality of teeth circumferentially arranged around said hub and having inner ends anchored thereto, each tooth having an inner portion convexed in a leading direction and having an intermediate portion trailingly disposed with respect to the inner portion and having a leading end contacting the trailing part of the intermediate portion of the tooth therahead and having a trailing part contacting the leading end of the intermediate portion of the tooth therebehind, and each tooth having an outer portion forwardly concaved, and means interconnecting said intermediate portions to each other to collectively provide a trash guard intermediate the hub and the outer periphery of the wheel.

2. The invention according to claim 1 and further characterized in that each of said teeth is formed of spring steel, or the like, and said teeth being collectively yieldable.

3. The invention according to claim 1 and each tooth diverging axially from the adjacent tooth from the innermost to the outermost extremities thereof.

4. The invention according to claim 1 wherein the outer end portions of adjacent teeth lie in radially outwardly diverging planes.

References Cited in the file of this patent

UNITED STATES PATENTS

| | | |
|---|---|---|
| 1,300,442 | Matoushek | Apr. 15, 1919 |
| 2,560,359 | McCardell | July 10, 1951 |
| 2,848,932 | Hopkins | Aug. 26, 1958 |